Patented Aug. 20, 1935

2,011,589

UNITED STATES PATENT OFFICE 2,011,589

PROCESS OF PRODUCING PENTAERYTHRITE

Thomas Ramsay Paterson, West Kilbride, Scotland, assignor to Imperial Chemical Industries Limited, a corporation of Great Britain No Drawing. Application July 8, 1932, Serial No. 621,519

9 Claims. (Cl. 260—156.5)

My invention relates to a new and improved process for the production of pentaerythrite.

Various methods for the preparation of pentaerythrite have hertofore been proposed. The earliest work appears to have been carried out by Tollens (Annalen, v. 265, p. 316, 1891; v. 276, p. 58, 1893). The method of Tollens, as well as that of Stettbacher (Zt. fur das Gesamte Schiess & Sprengstoffwesen, v. 11, p. 182, 1916), was not of commercial importance because of the great length of time required for the completion of the reaction.

More recently other processes for the production of pentaerythrite have been suggested having the advantage that less time is required for completion of the reaction. According to the methods of Aaronson, and of Burke, for example, where higher temperatures are used, the formation of pentaerythrite takes place in a few hours rather than after several weeks, as was the case with the older processes.

The method for the commercial synthesis of pentaerythrite comprises the condensation of formaldehyde with acetaldehyde in the presence of lime or other condensation agent. The reaction takes place as follows:

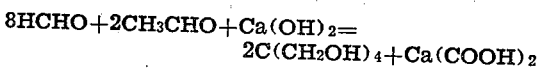

$$8HCHO + 2CH_3CHO + Ca(OH)_2 = 2C(CH_2OH)_4 + Ca(COOH)_2$$

Various side reactions may occur depending upon the relative amounts of different materials present and the conditions of procedure, but the main reaction is the one shown above, the resulting products being pentaerythrite, which is a solid polyhydric alcohol, and formic acid. Since both the resulting products are soluble in water, the method of separating pentaerythrite has an important bearing on the yield and purity of the product.

The methods heretofore employed for producing pentaerythrite have had several disadvantages, of which the two following may be cited. In the first place, relatively low yields of pentaerythrite have been obtained, not more than 65 to 70% of the theoretical amount under the most favorable conditions suggested. In the second place, the cost of isolating pentaerythrite from the other materials present with it, has been high, due to the necessity of using expensive precipitants for the removal of the excess of condensation agent or to the need for using organic solvents for removing the gummy materials from the crude pentaerythrite.

The conditions which have the greatest effect on the economic status of the process are (1) the temperature at which the reaction mixture is maintained, (2) the relative amount of condensing agent used, (3) the losses taking place due to side reactions, and (4) the efficiency of the method of removing the condensing agent, so that the pentaerythrite may be crystallized in pure form from the concentrated mother liquor.

According to the prior art, the amount of lime used as condensation agent has varied with two schools of investigators. The older process, for example, used an excess of lime (over 1.5 mols $Ca(OH)_2$ per mol of acetaldehyde) in the neighborhood of 200%. This was reasonably satisfactory for non-commercial processes which were carried out at a low temperature, where several weeks was to be allowed for the reaction to take place. Even in such cases, the presence of the large excess of lime meant increased difficulty in the removal of the lime. With the use of higher temperatures, such large excesses of lime would be altogether undesirable, due to side reactions that would take place, with resulting adverse effect on the yield.

The more recent processes, on the other hand, have used only a slight excess of lime (approximately 20%) over the amount theoretically necessary. Since an excess of formaldehyde is always used and since lime is consumed in greater proportions in the side reactions that proceed simultaneously with the formation of pentaerythrite, the use of this slight excess of lime does not favor the production of the best possible yields of pentaerythrite, a consideration that is paramount in an industrial process. It is thus essential to balance removal difficulties with increased yields to arrive at the most economical amount of condensing agent.

I have discovered that the most desirable results are obtained, both from the point of view of yield and ease of removal of lime, when an amount of condensing agent varying between 0.65 and 0.85 mols of lime to one of acetaldehyde is used. This corresponds to an excess of 30 to 70% over the amount necessary, based on the weight of acetaldehyde used.

While various temperatures have been employed at which the reaction mixtures have been maintained during the process, I find the most satisfactory temperature to be approximately 40 to 50° C. This range of temperatures has been found not only the most desirable from the point of view of yield, but also has the economic advantage of being the temperature most readily maintained. This temperature range is intermediate between that used in the older, long-time processes, 15° C., and the temperature of 60° to 65° more recently employed.

I have further found that a decided advantage results if the process is carried out so that acetaldehyde is slowly added beneath the surface of the agitated mixture of water, formaldehyde and lime. This procedure differs from the usual one where the lime is added to the mixed aldehydes. By following my improved procedure there is no excess acetaldehyde present at any time. This automatically prevents its reacting with itself in the presence of lime and in the absence of formaldehyde to form polymers of acetaldehyde, with consequent decreased yield. In addition, the sub-surface addition of the acetaldehyde avoids all possibility of loss of material, or unsatisfactory contact with the other reagents.

I find, furthermore, that a decided advantage results from an improved and more economical method for the removal of lime from the process and for the recovery of the pentaerythrite from the mother liquors. After the completion of the reaction, I add an amount of sulfuric acid sufficient to precipitate the calcium as insoluble calcium sulfate. This precipitate is removed by filtration. According to previous methods, the last portions of calcium have been removed by the addition of oxalic acid or other agents besides sulfuric acid, a step which has meant the use of a more expensive precipitating agent, as well as the introduction of an additional impurity and an added operation. I find it preferable, after removal of the calcium sulfate by precipitation and filtration, to concentrate the solution. In this way, due to temperature, the pentaerythrite is all brought into solution, and the residual precipitated calcium sulfate can then be removed by hot filtration. As a result of this, the solution is practically free from calcium without the use of a second precipitating agent. The first crop of pentaerythrite can then be crystallized out by cooling the solution. The remaining product can be obtained by reworking the mother liquors. Whereas operating with hot acid liquors has been undesirable in the past because of the corrosive action on the metal, the recent development of corrosion-resistant alloys has obviated this disadvantage.

By way of more specific illustration, my process may be carried out as follows: 40 grams of calcium oxide is slaked in a small amount of water and diluted with water to 1000 grams; 150 grams of formaldehyde in 250 grams of water is added with vigorous agitation. 44 grams of acetaldehyde is slowly run into the mixture of formaldehyde and lime, the acetaldehyde being introduced beneath the surface of the solution. Approximately 30 minutes is required for the addition of the acetaldehyde. Due to chemical reactions, the temperature will gradually increase to 40 to 50° C. Further increases in temperature are, however, prevented by suitable means. The reaction mixture is held at this temperature with agitation for approximately 3 hours. 140 grams of 50% sulfuric acid is then added. The calcium sulfate precipitated is removed by filtration. The filtrate is concentrated to a volume of approximately 300 cc. under vacuum, the temperature being held at 40 to 45° C. The concentrated solution is next heated to a temperature where all the pentaerythrite is in solution and the residual calcium sulfate is filered off. By cooling the solution to 15° C., pentaerythrite is crystalized out and may be removed by filtration, followed by a water wash for removal of surface impurities. The pentaerythrite remaining in the mother liquors can be recovered by the usual methods of reworking. Using this process, a yield of 80% or more can be uniformly obtained.

While I have described various embodiments of my invention, it will be apparent that other embodiments and variations exist and will readily suggest themselves to those skilled in the art from the disclosure given herein. Therefore I do not intend to be limited in the scope of my invention except as indicated in the following patent claims:

I claim:

1. The process of producing pentaerythrite which comprises condensing formaldehyde and acetaldehyde in aqueous solution in the presence of calcium hydroxide, in an amount corresponding to an excess of approximately 42 to 50% over the amount theoretically required, according to the herein disclosed reaction, based on the weight of acetaldehyde used, and maintaining a temperature of 40 to 50° C. during the reaction.

2. The process of claim 1 in which the acetaldehyde is added slowly to the solution containing formaldehyde and calcium hydroxide, while maintaining the temperature of the reaction at 40 to 50° C.

3. The process of claim 1 in which the acetaldehyde is added slowly beneath the surface of the solution containing formaldehyde and calcium hydroxide, while maintaining the temperature of the reaction at 40 to 50° C.

4. The process of producing pentaerythrite which comprises condensing formaldehyde and acetaldehyde in aqueous solution in the presence of calcium hydroxide, the calcium being subsequently removed in two stages, first by precipitation by sulfuric acid and removal from the unconcentrated solution, and second by hot filtration after concentration of the solution.

5. The process of producing pentaerythrite which comprises condensing formaldehyde and acetaldehyde in aqueous solution in the presence of calcium hydroxide, in an amount corresponding to an excess of 30 to 70% over the amount theoretically required, according to the herein described reaction based on the weight of acetaldehyde used, subsequently removing the calcium in two stages, first by precipitation by sulfuric acid and removal from the unconcentrated solution, and second by hot filtration after concentration of the solution.

6. The process of producing pentaerythrite which comprises condensing formaldehyde and acetaldehyde in aqueous solution in the presence of calcium hydroxide, in an amount corresponding to an excess of 30 to 70% over the amount theoretically required, according to the herein described reaction based on the weight of acetaldehyde used, maintaining the temperature during the reaction at 40 to 50° C., subsequently removing the calcium in two stages, first by precipitation by sulfuric acid and removal from the unconcentrated solution, and second by hot filtration after concentration of the solution.

7. In the process of producing pentaerythrite by condensing formaldehyde and acetaldehyde in aqueous solution in the presence of calcium hydroxide, in an amount corresponding to an excess of 30 to 70% over the amount theoretically required, according to the herein described reaction based on the weight of acetaldehyde used, which comprises adding the acetaldehyde slowly to the solution containing formaldehyde and calcium hydroxide, while maintaining the temperature of reaction at 40 to 50° C., subsequently removing the calcium in two stages, first by precipitation by sulfuric acid and removal from the unconcentrated solution, and second by hot filtration after concentration of the solution.

8. In the process of producing pentaerythrite by condensing formaldehyde and acetaldehyde in aqueous solution in the presence of calcium hydroxide, in an amount corresponding to an excess of 30 to 70% over the amount theoretically required, according to the herein described reaction based on the weight of acetaldehyde used, which comprises adding the acetaldehyde slowly beneath the surface of the solution containing formaldehyde and calcium hydroxide, while maintaining the temperature of reaction at 40 to 50° C., subsequently removing the calcium in two stages, first by precipitation by sulfuric acid and removal from the unconcentrated solution, and second by hot filtration after concentration of the solution.

9. In the process of producing pentaerythrite by condensing formaldehyde and acetaldehyde in aqueous solution in the presence of calcium hydroxide, in an amount corresponding to an excess of 30 to 70% over the amount theoretically required, according to the herein described reaction based on the weight of acetaldehyde used, which comprises adding the acetaldehyde slowly beneath the surface of the solution containing formaldehyde and calcium hydroxide, while maintaining the temperature of reaction at 40 to 50° C., subsequently removing the calcium in two stages, first by precipitation by sulfuric acid and removal from the unconcentrated solution, and second by hot filtration after concentration of the solution, the resulting crude pentaerythrite being freed from surface impurities by means of a water wash.

THOMAS RAMSAY PATERSON.